(12) United States Patent
Zhao et al.

(10) Patent No.: US 12,499,039 B2
(45) Date of Patent: Dec. 16, 2025

(54) MEMORY WRITE PERFORMANCE TECHNIQUES

(71) Applicant: Micron Technology, Inc., Boise, ID (US)

(72) Inventors: Bin Zhao, Shanghai (CN); Jonathan S. Parry, Boise, ID (US); Deping He, Boise, ID (US); Xu Zhang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 108 days.

(21) Appl. No.: 17/633,525

(22) PCT Filed: Mar. 18, 2021

(86) PCT No.: PCT/CN2021/081541
§ 371 (c)(1),
(2) Date: Feb. 7, 2022

(87) PCT Pub. No.: WO2022/193233
PCT Pub. Date: Sep. 22, 2022

(65) Prior Publication Data
US 2023/0359552 A1    Nov. 9, 2023

(51) Int. Cl.
*G06F 12/02*    (2006.01)

(52) U.S. Cl.
CPC .. *G06F 12/0246* (2013.01); *G06F 2212/7201* (2013.01)

(58) Field of Classification Search
None
See application file for complete search history.

(56) References Cited

U.S. PATENT DOCUMENTS

| 10,409,511 B1 * | 9/2019 | Subbarao | G06F 3/0607 |
| 11,687,363 B2 * | 6/2023 | Zhu | G06F 11/3433 |
| | | | 718/102 |
| 2014/0241052 A1 | 8/2014 | Golke et al. | |

(Continued)

OTHER PUBLICATIONS

ISA/CN, "International Search Report and Written Opinion of the International Searching Authority," issued in connection with Int'l Appl. No. PCT/CN2021/081541, dated Dec. 14, 2021 (8 pages).

*Primary Examiner* — Jared I Rutz
*Assistant Examiner* — Alexander J Yoon
(74) *Attorney, Agent, or Firm* — Holland & Hart LLP

(57) ABSTRACT

Methods, systems, and devices for memory write performance techniques are described. A memory system may receive a sequence of commands, for example from a host system. Based on a relationship between logical block addresses of the sequence of commands, the memory system may delay performing a memory management operation (e.g., a garbage collection procedure, a power operation, a cache synchronization operation, a data relocation operation, or the like) for a duration. For example, the memory system may determine whether a quantity of write commands in the sequence that include non-consecutive logical block addresses exceeds a threshold. In some cases, the memory system may perform one or more commands in the sequence during the duration. Subsequently (e.g., at the end of the duration), the memory system may perform the memory management operation.

20 Claims, 5 Drawing Sheets

(56) References Cited

U.S. PATENT DOCUMENTS

| | | | |
|---|---|---|---|
| 2014/0281338 A1* | 9/2014 | Choi | G06F 3/0688 |
| | | | 711/170 |
| 2016/0188211 A1* | 6/2016 | Song | G06F 3/0689 |
| | | | 711/114 |
| 2016/0371014 A1* | 12/2016 | Roberts | G06F 3/0688 |
| 2017/0123972 A1* | 5/2017 | Gopinath | G06F 3/0616 |
| 2017/0147208 A1 | 5/2017 | Shu et al. | |
| 2017/0351438 A1 | 12/2017 | Lee et al. | |
| 2018/0081817 A1* | 3/2018 | Turner | G06F 12/0815 |
| 2019/0171389 A1* | 6/2019 | Muthiah | G06F 12/0246 |
| 2020/0133898 A1* | 4/2020 | Therene | G06F 3/061 |
| 2022/0066648 A1* | 3/2022 | Gunda | G11C 11/5635 |

* cited by examiner

MEMORY WRITE PERFORMANCE TECHNIQUES

CROSS REFERENCE

The present application for patent is a 371 national phase filing of International Patent Application No. PCT/CN2021/081541 by ZHAO et al., entitled "MEMORY WRITE PERFORMANCE TECHNIQUES," filed Mar. 18, 2021, assigned to the assignee hereof, and expressly incorporated by reference herein.

FIELD OF TECHNOLOGY

The following relates generally to one or more systems for memory and more specifically to memory write performance techniques.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
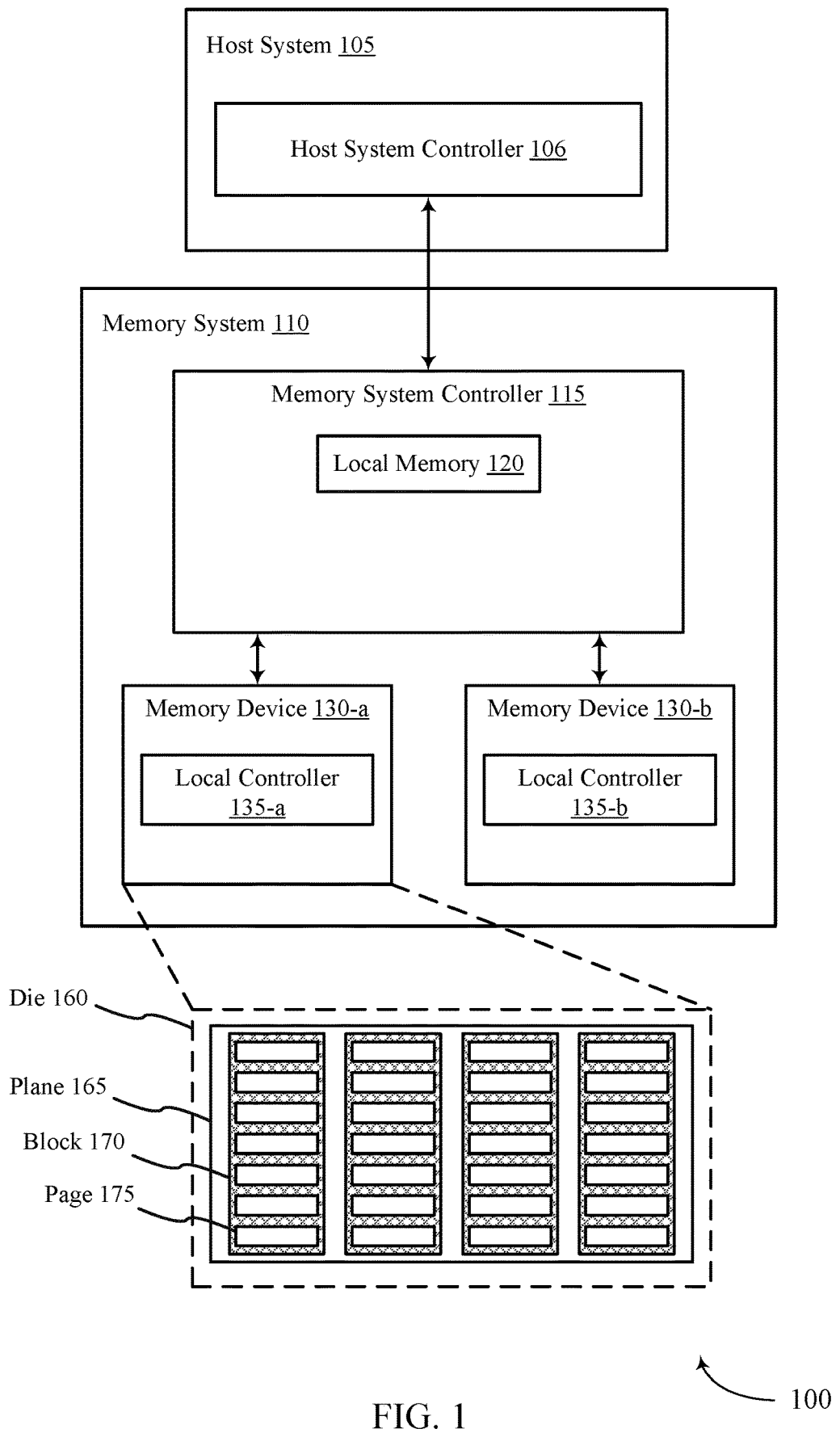
FIG. 1 illustrates an example of a system that supports memory write performance techniques in accordance with examples as disclosed herein.

Memory devices of a memory system may store data at a corresponding physical address, where a physical address may identify a physical location of a corresponding memory cell (e.g., or a page of memory cells) within a memory device. The physical location of data within the memory device may change over time due to the memory device accommodating the writing of additional data, maintenance operations performed by the memory device (e.g., garbage collection operations), or for other reasons. A host system coupled with the memory system may reference data (e.g., if issuing read, write, or other commands associated with the data) using logical addresses (e.g., logical block addresses (LBAs), virtual addresses, system addresses, or other logical addresses), and the memory device (e.g., or the memory system) may generate and maintain a mapping between the logical addresses used in the communications with the host system and the physical addresses of the memory cells at which the data is stored, which may support the memory device changing the physical addresses over time.

A memory system may receive a sequence of commands (e.g., a sequence of non-consecutive write commands with corresponding LBAs that include non-sequential blocks of memory) from a host system, for example as part of a benchmarking procedure. In some cases, the memory system may be configured to perform one or more memory management operations to improve the performance of the memory system prior to performing the sequence of commands. However, performing the memory management operations prior to performing the sequence of write commands may result in an increased amount of time before performing the write commands received from the host system and increased power consumption. For example, the memory management operations may include a garbage collection operation, which may result in additional overhead associated with the sequence of non-consecutive write commands (e.g., updating a logical-to-physical (L2P) mapping table).

Techniques, systems, and devices are described herein for increasing performance and reducing latency associated with performing write commands. A memory system may receive a sequence of commands, for example from a host system. In some examples, the sequence of commands may include read commands, write commands, modify commands, unmap commands (e.g., a command to discard, unwrite, or unmap an LBA), copy commands, or any combination thereof. Based on a relationship between LBAs of the sequence of commands, the memory system may delay performing a memory management operation (e.g., a garbage collection procedure, a power operation, a cache synchronization operation, a data relocation operation, or the like). For example, the memory system may receive a sequence of non-consecutive write commands (e.g., a sequence of write commands with corresponding logical addresses that include non-sequential blocks of memory), a sequence of unmap commands, a sequence of copy commands, or any combination thereof. The memory system may determine whether the quantity of commands in the sequence exceeds a threshold. Additionally or alternatively, the memory system may determine whether the size of the data associated with each command of the sequence of commands is smaller than a data threshold (e.g., the memory system may determine whether the sequence of write commands are part of a benchmarking procedure). Based on receiving the sequence of commands, the memory system may delay performing the memory management operation for a duration (e.g., an idle period). Additionally or alternatively, the memory system may allocate additional space in a cache (e.g., a static random access memory (SRAM)) for performing the sequence of commands. In some cases, the memory system may perform the sequence of commands during the duration. Subsequently (e.g., after the end of the duration), the memory system may perform the memory management operation. Delaying the performance of the memory management operation may increase the speed and efficiency of the memory system by performing the sequence of commands prior to performing the memory management operation, thus reducing overhead associated with the memory management operation.

Features of the disclosure are initially described in the context of systems with reference to FIG. 1. Features of the disclosure are described in the context of a process flow with reference to FIG. 2. These and other features of the disclosure are further illustrated by and described in the context of an apparatus diagram and a flowchart that relate to memory write performance techniques with reference to FIGS. 3-4.

FIG. 1 illustrates an example of a system 100 that supports memory write performance techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include SRAM or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, the memory system 110 may receive a sequence of commands, for example from the host system 105. In some examples, the sequence of commands may include read commands, write commands, modify commands, unmap commands, copy commands, or any combination thereof. Based on a relationship between LBAs of the sequence of commands, the memory system controller 115 may delay performing a memory management operation (e.g., a garbage collection procedure, a power operation, a cache synchronization operation, a data relocation operation, or the like). For example, the memory system controller 115 may receive a sequence of non-consecutive write commands (e.g., a sequence of write commands with corresponding logical addresses that include non-sequential blocks of memory), a sequence of unmap commands, a sequence of copy commands, or any combination thereof. Such a sequence of non-consecutive write commands may be referred to as a random write benchmark, in some cases. The memory system controller 115 may determine whether the quantity of commands in the sequence exceeds a threshold. Additionally or alternatively, the memory system controller 115 may determine whether the size of the data associated with each command of the sequence of commands is smaller than a data threshold (e.g., the memory system controller 115 may determine whether the sequence of commands are part of a benchmarking procedure). Based on receiving the sequence of commands, the memory system controller 115 may delay performing the memory management operation for a duration (e.g., an idle period). In some cases, the memory system controller 115 may perform the sequence of commands during the duration. Subsequently (e.g., at the end of the duration), the memory system controller 115 may perform the memory management operation. Delaying performing the memory management operation may increase the speed and efficiency of the memory system 110 by performing the sequence of commands prior to performing the memory management operation, thus reducing overhead associated with the memory management operation.

The system 100 may include any quantity of non-transitory computer readable media that support memory write performance techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
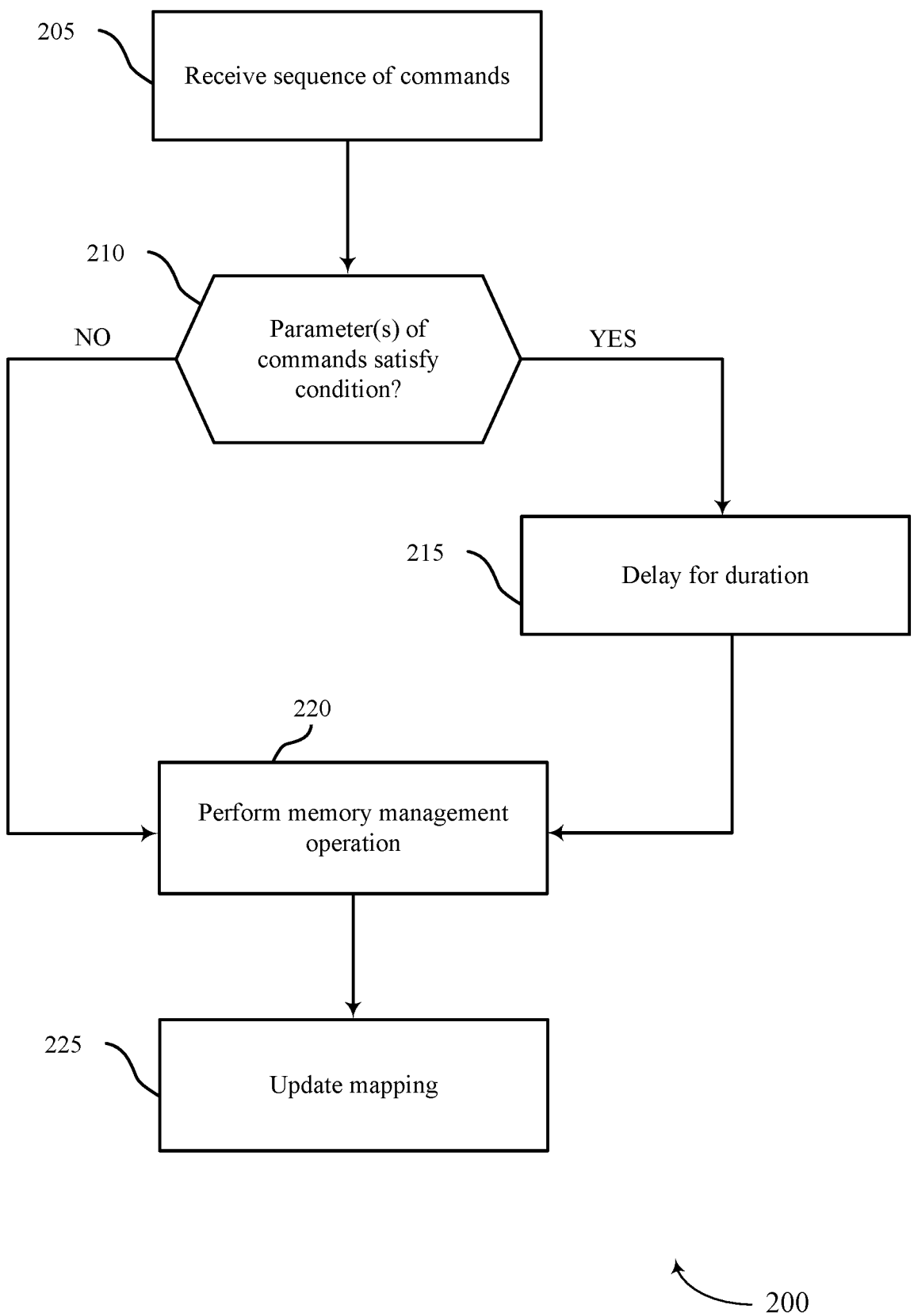
FIG. 2 illustrates an example of a process flow that supports memory write performance techniques in accordance with examples as disclosed herein.

FIG. 2 illustrates an example of a process flow 200 that supports memory write performance techniques in accordance with examples as disclosed herein. The process flow 200 may be performed by components of a memory system, such as a memory system 110 described with reference to FIG. 1. For example, the process flow 200 may be performed by a controller of a memory system or a memory device (or both) such as a memory system controller 115 or a local controller 135 as described with reference to FIG. 1. The process flow 200 may depict a process for performing commands based on a relationship between logical addresses of the commands. The process flow 200 may be implemented to reduce latency and power consumption and increase system performance, among other benefits. Aspects of the process flow 200 may be implemented by a controller, among other components. Additionally or alternatively, aspects of the process flow 200 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 200.

In the following description of the process flow 200, the operations may be performed in different orders or at different times. Some operations may also be omitted from the process flow 200, and other operations may be added to the process flow 200.

At 205, a sequence of commands may be received. For example, a memory system controller of the memory system may receive a sequence of commands to access LBAs of the memory system. In some examples, the sequence of commands may be a set of write commands that include a quantity of non-consecutive LBAs, a set of unmap commands, a set of copy commands, or any combination thereof. That is, the logical address of each of the commands may indicate different blocks of memory for each command. In some examples, the sequence of commands may be associated with random write commands received as part of a benchmark procedure. In some cases, the sequence of commands may be stored in the buffer associated with the memory system (e.g., an unexecuted portion of the of the sequence of commands may be stored in the buffer as part of a queue). A sequence of commands may refer to any combination of commands received or a duration or any combination of commands stored in one or more buffers and waiting to be performed by memory system.

Accessing non-consecutive LBAs may take more time than accessing consecutive LBAs because of transferring portions of a logical-to-physical (L2P) address mapping between permanent storage (e.g., a NAND device) and a cache (e.g., an SRAM) as part of performing the access operations. For example, the L2P mapping may be large enough that it cannot be stored in its entirety in the SRAM of the memory system. In such cases, the memory system may store the L2P mapping in a NAND device and may load portions of the L2P mapping into the SRAM to perform the access operations. Performing operations with non-consecutive LBAs may cause the memory system to load and re-load different portions into the SRAM, thereby increasing the latency for performing some access operations (as compared with using consecutive LBAs).

At 210, the sequence of commands may be evaluated as to whether parameters of the sequence of commands satisfy a condition. For example, the sequence of commands may be evaluated as to whether a relationship between LBAs of the sequence of commands satisfies a condition (e.g., the sequence includes consecutive LBAs or non-consecutive LBAs). In some examples, the memory system may determine that the quantity of the sequence of commands exceeds a threshold. In some cases, the memory system may determine whether a quantity of commands of the sequence that include non-consecutive LBAs (or consecutive LBAs) exceeds a threshold. Additionally or alternatively, the memory system may determine that a size of data associated with each command of the sequence of commands is less than a data size threshold. For example, the memory system may determine that the sequence of non-consecutive write commands, unmap commands, or copy commands include small amounts of data. In some cases, the size of data associated with each command satisfying the threshold may indicate that the sequence of commands is part of a benchmark procedure.

In some examples, the memory system may determine whether the second sequence of commands stored in the buffer satisfies a buffer threshold (e.g., a queue depth of a buffer may satisfy a threshold). For example, determining whether the second sequence of commands satisfies the buffer threshold may include comparing the quantity of the second sequence of commands to a queue depth threshold (e.g., determining a quantity of commands that have been received but not executed). If, at 210, the controller identifies that the sequence of commands satisfies a condition, the controller may perform 215 through 225.

At 215, a memory management operation may be delayed for a duration (e.g., an idle period) after receiving the sequence of commands at 205. Additionally or alternatively, the memory system may allocate more space in a cache (e.g., an SRAM) to perform the sequence of commands based on delaying the memory management operation for the duration. The additional space in the cache may be used to store additional portions of mappings (e.g., an L2P mapping or a validity mapping) used to perform the sequence of commands. In some cases, during the duration, data may be written to the non-consecutive LBAs of the memory device. For example, the memory system may perform at least a portion of the sequence of commands received at 205 by writing the data to the physical addresses corresponding to the non-consecutive LBAs associated with the sequence of commands. The length of the delay may be based on the quantity of commands in the sequence of commands. For example, the length of the delay may be such that the memory system may have sufficient time to perform the sequence of commands. Once the duration expires, the memory system may allocate (or re-allocate) space in the cache (e.g., SRAM) to perform the memory management operation. At least a portion of the duration may overlap with an idle state or an idle period of the memory system.

The techniques described herein may provide one or more benefits. In some cases, the techniques described herein may boost the performance of the memory system in a given benchmark. For example, these techniques may improve the performance of the memory system to perform random writes (e.g., reduce a latency to perform the operations). In some cases, the techniques may provide a temporary performance boost for a random write situations before other operations (e.g., memory management operations) may use computational resources that thereby causes the latency to perform the write operations increases.

If, at 210, the controller does not identify that the sequence of commands satisfies a condition, the controller may perform 220 through 225. For example, if the controller identifies that the quantity of commands exceeds a threshold, the controller may perform 220 through 225.

At 220, the memory management operation may be performed. In some cases, the memory management operation may include a garbage collection procedure, a power operation, a cache synchronization operation, and/or a data relocation operation, among other examples.

At 225, the mapping between LBAs and physical block addresses may be updated. For example, because the memory management operation performed at 220 may include operations (e.g., a garbage collection procedure) which relocate data (e.g., update the location of the data), the mapping between LBAs and physical block addresses (e.g., L2P mapping) may no longer be valid. Thus, the memory system may update the mapping such that the LBAs correspond to updated physical block addresses of the relocated data. In some cases, the cache may be updated based on updating the mapping at 225.

In some examples, the sequence of commands received at 205 may not include non-consecutive write commands. For example, the sequence of commands may additionally or alternatively include non-consecutive read commands, consecutive read commands, consecutive write commands, or a combination thereof. In such examples, the memory management operation may be delayed for the duration based on a relationship (e.g., consecutive or non-consecutive commands) between the LBAs of the sequence of commands.

Figure 3:
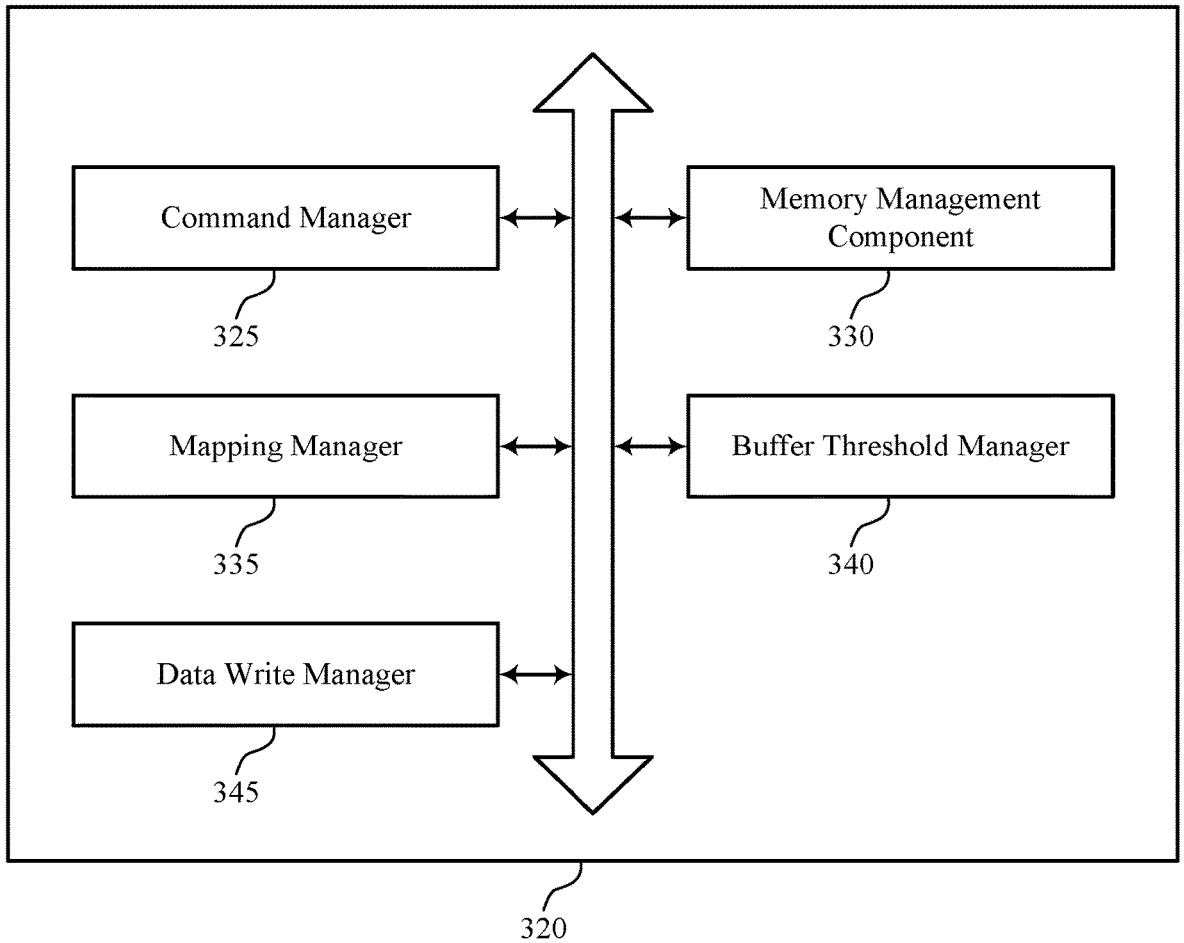
FIG. 3 shows a block diagram of a memory system that supports memory write performance techniques in accordance with examples as disclosed herein.

FIG. 3 shows a block diagram 300 of a memory system 320 that supports memory write performance techniques in accordance with examples as disclosed herein. The memory system 320 may be an example of aspects of a memory system as described with reference to FIGS. 1 through 2. The memory system 320, or various components thereof, may be an example of means for performing various aspects of memory write performance techniques as described herein. For example, the memory system 320 may include a command manager 325, a memory management component 330, a mapping manager 335, a buffer threshold manager 340, a data write manager 345, or any combination thereof. Each of these components may communicate, directly or indirectly, with one another (e.g., via one or more buses).

The command manager 325 may be configured as or otherwise support a means for receiving a quantity of write commands that include non-consecutive logical block addresses of the memory system, where the quantity of write commands satisfy a threshold. The memory management component 330 may be configured as or otherwise support a means for delaying a performance of a memory management operation for a duration after receiving the quantity of write commands, where the duration is based at least in part on the quantity of write commands satisfying the threshold. In some examples, the memory management component 330 may be configured as or otherwise support a means for performing the memory management operation after the duration. The mapping manager 335 may be configured as or otherwise support a means for updating a mapping between logical block addresses and physical addresses of the memory system based at least in part on performing the memory management operation.

In some examples, the command manager 325 may be configured as or otherwise support a means for determining that a size of data associated with each write command of the quantity of write commands is less than a data size threshold, where delaying the performance of the memory management operation for the duration is based at least in part on determining that the size of the data is less than the data size threshold.

In some examples, the command manager 325 may be configured as or otherwise support a means for receiving a second quantity of commands, where the second quantity of commands include unmap commands, copy commands, or both, and where delaying the performance of the memory management operation for the duration is based at least in part on receiving the second quantity of commands.

In some examples, delaying the performance of the memory management operation for the duration is based at least in part on the quantity of write commands including the non-consecutive logical block addresses.

In some examples, the buffer threshold manager 340 may be configured as or otherwise support a means for determining whether a second quantity of write commands stored in a buffer before being performed satisfies a buffer threshold, where delaying the performance of the memory management operation for the duration is based at least in part on determining whether the second quantity of write commands satisfies the buffer threshold. In some examples, the duration includes an idle period at the memory system.

In some examples, the data write manager 345 may be configured as or otherwise support a means for writing data to the non-consecutive logical block addresses based at least in part on receiving the quantity of write commands and updating the mapping.

In some examples, the memory management operation includes a power operation, a cache synchronization operation, a data relocation operation, or any combination thereof.

In some examples, the command manager 325 may be configured as or otherwise support a means for receiving a sequence of commands to access logical block addresses of the memory system. In some examples, the memory management component 330 may be configured as or otherwise support a means for delaying a performance of a memory management operation for a duration after receiving the sequence of commands, where the duration is based at least in part on a relationship between the logical block addresses of the sequence of commands. In some examples, the memory management component 330 may be configured as or otherwise support a means for performing the memory management operation after the duration. In some examples, the mapping manager 335 may be configured as or otherwise support a means for updating a mapping between the logical block addresses and physical addresses of the memory system based at least in part on performing the memory management operation.

In some examples, the mapping manager 335 may be configured as or otherwise support a means for updating a cache at the memory system based at least in part on updating the mapping.

In some examples, the buffer threshold manager 340 may be configured as or otherwise support a means for determining whether a quantity of commands stored in a buffer before being performed satisfies a buffer threshold, where delaying the performance of the memory management operation for the duration is based at least in part on determining whether the quantity of commands satisfies the buffer threshold.

In some examples, the relationship between the logical block addresses of the sequence of commands includes a consecutive relationship or a non-consecutive relationship. In some examples, the sequence of commands include one or more write commands, one or more read commands, one or more modify commands, one or more unmap commands, one or more copy commands, or any combination thereof. In some examples, the memory management operation includes a power operation, a cache synchronization operation, a data relocation operation, or any combination thereof.

Figure 4:
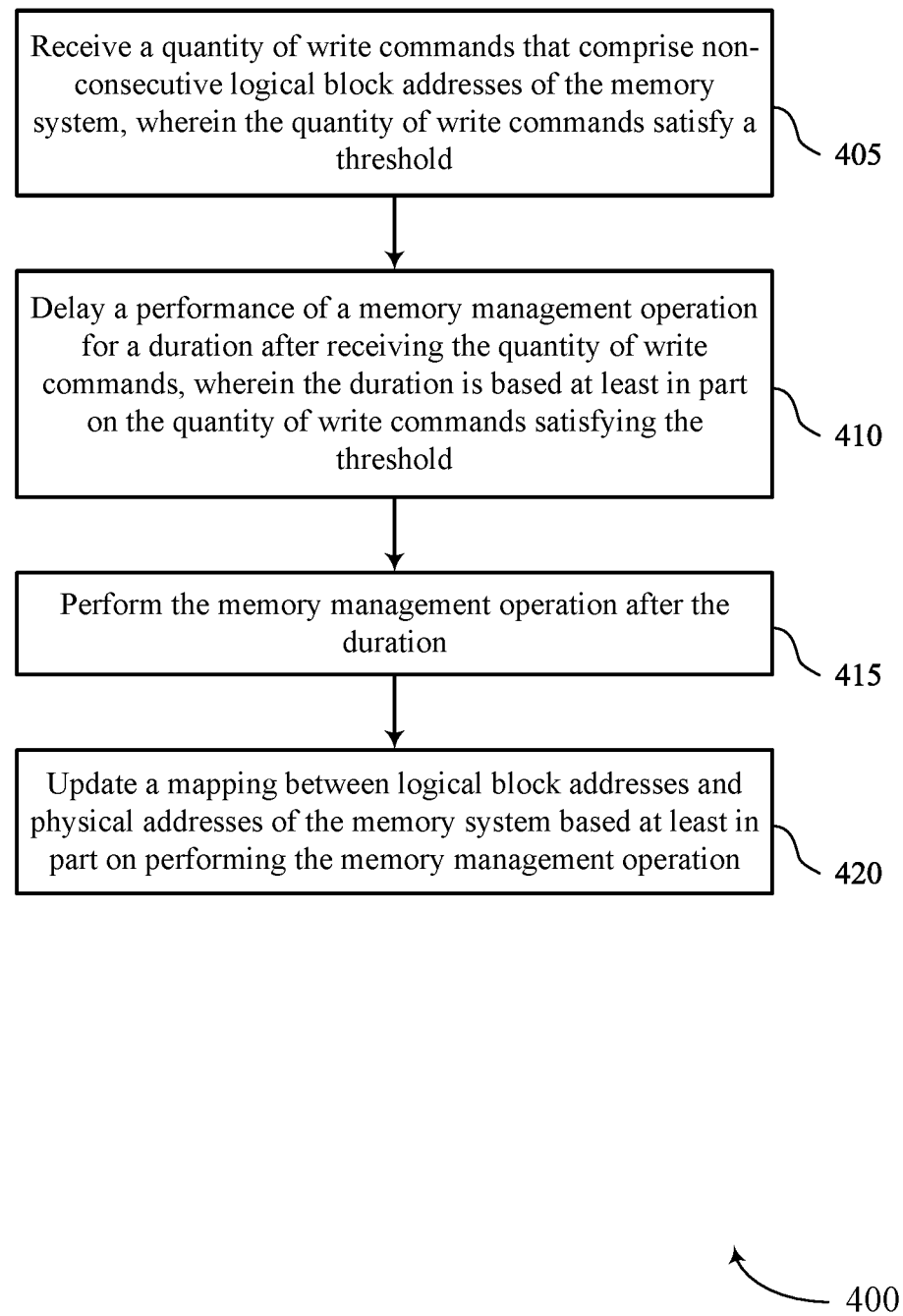
FIGS. 4 and 5 show flowcharts illustrating a method or methods that support memory write performance techniques in accordance with examples as disclosed herein.

FIG. 4 shows a flowchart illustrating a method 400 that supports memory write performance techniques in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally or alternatively, the memory system may perform aspects of the described functions using special-purpose hardware.

At 405, the method may include receiving a quantity of write commands that include non-consecutive logical block addresses of the memory system, where the quantity of write commands satisfy a threshold. The operations of 405 may be performed in accordance with examples as disclosed herein.

In some examples, aspects of the operations of 405 may be performed by a command manager 325 as described with reference to FIG. 3.

At 410, the method may include delaying a performance of a memory management operation for a duration after receiving the quantity of write commands, where the duration is based at least in part on the quantity of write commands satisfying the threshold. The operations of 410 may be performed in accordance with examples as disclosed herein. In some examples, aspects of the operations of 410 may be performed by a memory management component 330 as described with reference to FIG. 3.

At 415, the method may include performing the memory management operation after the duration. The operations of 415 may be performed in accordance with examples as disclosed herein. In some examples, aspects of the operations of 415 may be performed by a memory management component 330 as described with reference to FIG. 3.

At 420, the method may include updating a mapping between logical block addresses and physical addresses of the memory system based at least in part on performing the memory management operation. The operations of 420 may be performed in accordance with examples as disclosed herein. In some examples, aspects of the operations of 420 may be performed by a mapping manager 335 as described with reference to FIG. 3.

In some examples, an apparatus as described herein may perform a method or methods, such as the method 400. The apparatus may include, features, circuitry, logic, means, or instructions (e.g., a non-transitory computer-readable medium storing instructions executable by a processor) for receiving a quantity of write commands that include non-consecutive logical block addresses of the memory system, where the quantity of write commands satisfy a threshold, delaying a performance of a memory management operation for a duration after receiving the quantity of write commands, where the duration is based at least in part on the quantity of write commands satisfying the threshold, performing the memory management operation after the duration, and updating a mapping between logical block addresses and physical addresses of the memory system based at least in part on performing the memory management operation.

Some examples of the method 400 and the apparatus described herein may further include operations, features, circuitry, logic, means, or instructions for determining that a size of data associated with each write command of the quantity of write commands may be less than a data size threshold, where delaying the performance of the memory management operation for the duration may be based at least in part on determining that the size of the data may be less than the data size threshold.

Some examples of the method 400 and the apparatus described herein may further include operations, features, circuitry, logic, means, or instructions for delaying the performance of the memory management operation for the duration may be based at least in part on the quantity of write commands including the non-consecutive logical block addresses.

Some examples of the method 400 and the apparatus described herein may further include operations, features, circuitry, logic, means, or instructions for determining whether a second quantity of write commands stored in a buffer before being performed satisfies a buffer threshold, where delaying the performance of the memory management operation for the duration may be based at least in part on determining whether the second quantity of write commands satisfies the buffer threshold.

Some examples of the method 400 and the apparatus described herein may further include operations, features, circuitry, logic, means, or instructions for receiving a second quantity of commands, where the second quantity of commands include unmap commands, copy commands, or both, and where delaying the performance of the memory management operation for the duration is based at least in part on receiving the second quantity of commands.

In some examples of the method 400 and the apparatus described herein, the duration includes an idle period at the memory system.

Some examples of the method 400 and the apparatus described herein may further include operations, features, circuitry, logic, means, or instructions for writing data to the non-consecutive logical block addresses based at least in part on receiving the quantity of write commands and updating the mapping.

In some examples of the method 400 and the apparatus described herein, the memory management operation includes a power operation, a cache synchronization operation, a data relocation operation, or any combination thereof.

Figure 5:
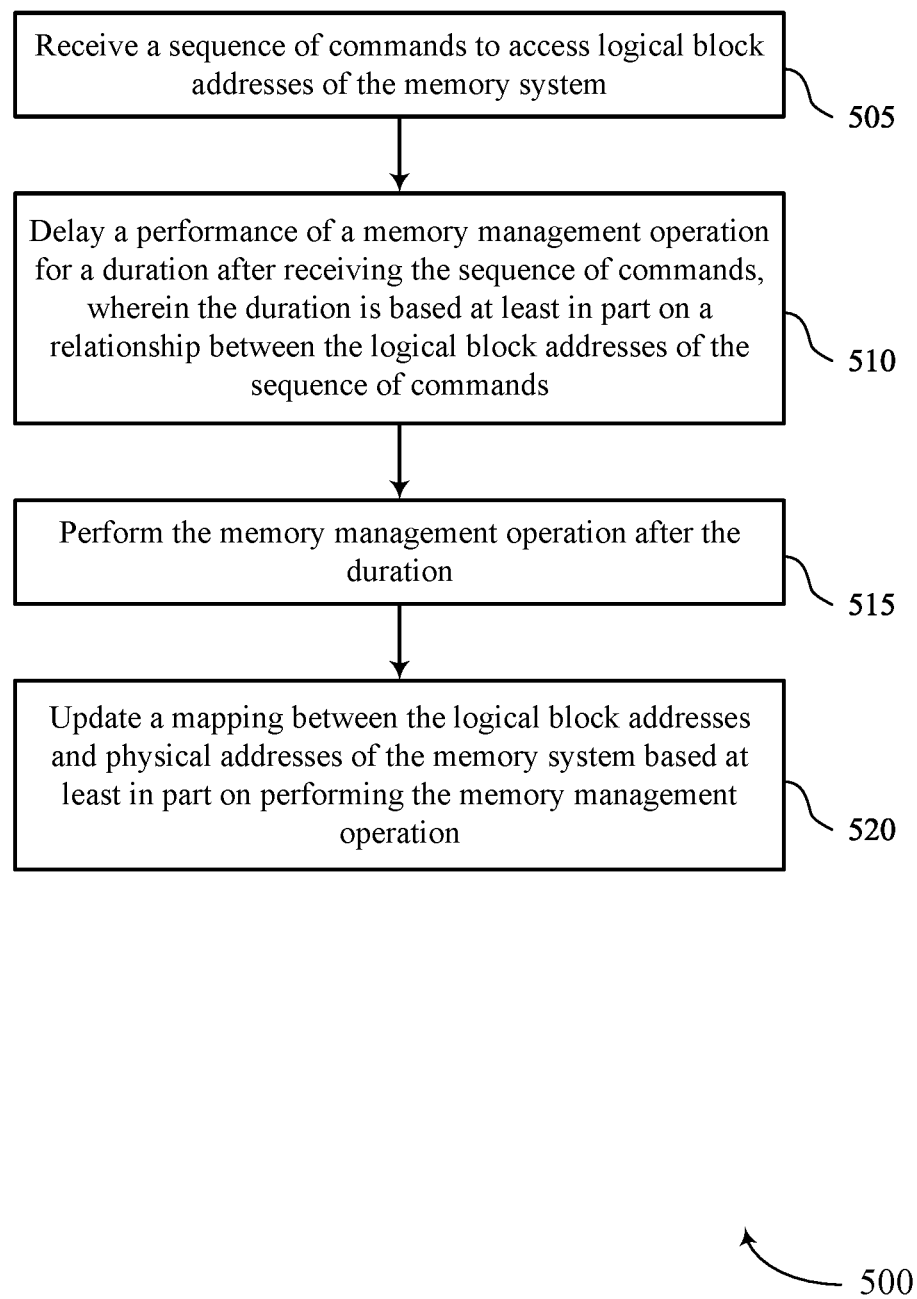

FIG. 5 shows a flowchart illustrating a method 500 that supports memory write performance techniques in accordance with examples as disclosed herein. The operations of method 500 may be implemented by a memory system or its components as described herein. For example, the operations of method 500 may be performed by a memory system as described with reference to FIGS. 1 through 3. In some examples, a memory system may execute a set of instructions to control the functional elements of the device to perform the described functions. Additionally or alternatively, the memory system may perform aspects of the described functions using special-purpose hardware.

At 505, the method may include receiving a sequence of commands to access logical block addresses of the memory system. The operations of 505 may be performed in accordance with examples as disclosed herein. In some examples, aspects of the operations of 505 may be performed by a command manager 325 as described with reference to FIG. 3.

At 510, the method may include delaying a performance of a memory management operation for a duration after receiving the sequence of commands, where the duration is based at least in part on a relationship between the logical block addresses of the sequence of commands. The operations of 510 may be performed in accordance with examples as disclosed herein. In some examples, aspects of the operations of 510 may be performed by a memory management component 330 as described with reference to FIG. 3.

At 515, the method may include performing the memory management operation after the duration. The operations of 515 may be performed in accordance with examples as disclosed herein. In some examples, aspects of the operations of 515 may be performed by a memory management component 330 as described with reference to FIG. 3.

At 520, the method may include updating a mapping between the logical block addresses and physical addresses of the memory system based at least in part on performing the memory management operation. The operations of 520 may be performed in accordance with examples as disclosed herein. In some examples, aspects of the operations of 520 may be performed by a mapping manager 335 as described with reference to FIG. 3.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving a sequence of commands to access logical block addresses of the memory system, delaying a performance of a memory management operation for a duration after receiving the sequence of commands, where the duration is based at least in part on a relationship between the logical block addresses of the sequence of commands, performing the memory management operation after the duration, and updating a mapping between the logical block addresses and physical addresses of the memory system based at least in part on performing the memory management operation.

Some examples of the method 500 and the apparatus described herein may further include operations, features, circuitry, logic, means, or instructions for updating a cache at the memory system based at least in part on updating the mapping.

Some examples of the method 500 and the apparatus described herein may further include operations, features, circuitry, logic, means, or instructions for determining whether a quantity of commands stored in a buffer before being performed satisfies a buffer threshold, where delaying the performance of the memory management operation for the duration may be based at least in part on determining whether the quantity of commands satisfies the buffer threshold.

In some examples of the method 500 and the apparatus described herein, the relationship between the logical block addresses of the sequence of commands includes a consecutive relationship or a non-consecutive relationship.

In some examples of the method 500 and the apparatus described herein, the sequence of commands include one or more write commands, one or more read commands, one or more modify commands, one or more unmap commands, one or more copy commands, or any combination thereof.

In some examples of the method 500 and the apparatus described herein, the memory management operation includes a power operation, a cache synchronization operation, a data relocation operation, or any combination thereof.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device and a controller coupled with the memory device and configured to cause the apparatus to receive a quantity of write commands that include non-consecutive logical block addresses of the memory device, where the quantity of write commands satisfy a threshold, delay performing a memory management operation for a duration after receiving the quantity of write commands, where the duration is based at least in part on the quantity of write commands satisfying the threshold, perform the memory management operation after the duration, and update a mapping between logical block addresses and physical addresses of the memory device based at least in part on performing the memory management operation.

In some examples of the apparatus, the controller may be further configured to cause the apparatus to determine that a size of data associated with each write command of the quantity of write commands may be less than a data size threshold, where delaying the performance of the memory management operation for the duration may be based at least in part on determining that the size of the data may be less than the data size threshold.

In some examples of the apparatus, delaying the performance of the memory management operation for the duration may be based at least in part on the quantity of write commands including the non-consecutive logical block addresses.

In some examples of the apparatus, the controller may be further configured to cause the apparatus to determine whether a second quantity of write commands stored in a buffer before being performed satisfies a buffer threshold, where delaying the performance of the memory management operation for the duration may be based at least in part on determining whether the second quantity of write commands satisfies the buffer threshold.

In some examples of the apparatus, the duration includes an idle period at the memory device.

In some examples of the apparatus, the controller may be further configured to cause the apparatus to receive a second quantity of commands, where the second quantity of commands may include unmap commands, copy commands, or both, and where delaying the performance of the memory management operation for the duration may be based at least in part on receiving the second quantity of commands.

In some examples of the apparatus, the controller may be further configured to cause the apparatus to write data to the non-consecutive logical block addresses based at least in part on receiving the quantity of write commands and updating the mapping.

In some examples of the apparatus, the memory management operation includes a power operation, a cache synchronization operation, a data relocation operation, or any combination thereof.

Another apparatus is described. The apparatus may include a memory device and a controller coupled with the memory device and operable to cause the apparatus to receive a sequence of commands to access logical block addresses of the memory device, delay a performance of a memory management operation for a duration after receiving the sequence of commands, where the duration is based at least in part on a relationship between the logical block addresses of the sequence of commands, perform the memory management operation after the duration, and update a mapping between the logical block addresses and physical addresses of the memory device based at least in part on performing the memory management operation.

In some examples of the apparatus, the controller may be further configured to cause the apparatus to update a cache at the memory device based at least in part on updating the mapping.

In some examples of the apparatus, the controller may be further configured to cause the apparatus to determine whether a quantity of commands stored in a buffer before being performed satisfies a buffer threshold, where delaying the performance of the memory management operation for the duration may be based at least in part on determining whether the quantity of commands satisfies the buffer threshold.

In some examples of the apparatus, the relationship between the logical block addresses of the sequence of commands includes a consecutive relationship or a non-consecutive relationship.

In some examples of the apparatus, the sequence of commands include one or more write commands, one or more read commands, one or more modify commands, one or more unmap commands, one or more copy commands, or any combination thereof.

In some examples of the apparatus, the memory management operation includes a power operation, a cache synchronization operation, a data relocation operation, or any combination thereof.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to:
   determine a configuration for performance of a memory management operation;
   receive, before performing the memory management operation, a quantity of write commands;
   determine whether the quantity of write commands comprise non-consecutive logical block addresses of the one or more memory devices;
   delay the configured performance of the memory management operation for a duration after receiving the quantity of write commands in response to the quantity of write commands satisfying a quantity threshold, a size of data associated with each write command satisfying a data size threshold, and determining that the write commands comprise the non-consecutive logical block addresses, wherein the duration is based at least in part on the quantity of write commands;
   perform, during the duration, one or more write operations in accordance with at least one write command of the quantity of write commands;
   perform the memory management operation after performing the one or more write operations and delaying the configured performance of the memory management operation for the duration; and
   update a mapping between logical block addresses and physical addresses of the one or more memory devices based at least in part on performing the memory management operation.

2. The memory system of claim 1, wherein the processing circuitry is further configured to cause the memory system to:
   determine whether a second quantity of write commands stored in a buffer before being performed satisfies a buffer threshold, wherein delaying the configured performance of the memory management operation for the duration is based at least in part on determining whether the second quantity of write commands satisfies the buffer threshold.

3. The memory system of claim 1, wherein the processing circuitry is further configured to cause the memory system to:
receive a second quantity of commands comprising unmap commands, copy commands, or both, wherein delaying the configured performance of the memory management operation for the duration is based at least in part on receiving the second quantity of commands.

4. The memory system of claim 1, wherein the processing circuitry is further configured to cause the memory system to:
write data to the non-consecutive logical block addresses based at least in part on receiving the quantity of write commands and updating the mapping.

5. The memory system of claim 1, wherein the memory management operation comprises a power operation, a cache synchronization operation, a data relocation operation, or any combination thereof.

6. The memory system of claim 1, wherein the processing circuitry is further configured to cause the memory system to:
store, based at least in part on delaying the configured performance of the memory management operation, a portion of the mapping associated with the write commands to a portion of a buffer based at least in part on allocating the buffer for the mapping; and
reallocate, after storing the portion of the mapping, the buffer for the memory management operation based at least in part on performing a write command of the quantity of write commands, wherein performing the memory management operation is based at least in part on reallocating the buffer.

7. A non-transitory computer-readable medium storing code comprising instructions which, when executed by a processor of an electronic device, cause the electronic device to:
determine a configuration for performance of a memory management operation;
receive, before performing the memory management operation, a quantity of write commands;
determine whether the quantity of write commands comprise non-consecutive logical block addresses of one or more memory devices;
delay the configured performance of the memory management operation for a duration after receiving the quantity of write commands in response to the quantity of write commands satisfying a quantity threshold, a size of data associated with each write command satisfying a data size threshold, and determining that the write commands comprise the non-consecutive logical block addresses, wherein the duration is based at least in part on the quantity of write commands;
perform, during the duration, one or more write operations in accordance with at least one write command of the quantity of write commands;
perform the memory management operation after performing the one or more write operations and delaying the configured performance of the memory management operation for the duration; and
update a mapping between logical block addresses and physical addresses of the one or more memory devices based at least in part on performing the memory management operation.

8. The non-transitory computer-readable medium of claim 7, wherein the instructions, when executed by the processor of the electronic device, further cause the electronic device to:
determine whether a second quantity of write commands stored in a buffer before being performed satisfies a buffer threshold, wherein delaying the configured performance of the memory management operation for the duration is based at least in part on determining whether the second quantity of write commands satisfies the buffer threshold.

9. The non-transitory computer-readable medium of claim 7, wherein the instructions, when executed by the processor of the electronic device, further cause the electronic device to:
receive a second quantity of commands comprising unmap commands, copy commands, or both, wherein delaying the configured performance of the memory management operation for the duration is based at least in part on receiving the second quantity of commands.

10. The non-transitory computer-readable medium of claim 7, wherein the instructions, when executed by the processor of the electronic device, further cause the electronic device to:
write data to the non-consecutive logical block addresses based at least in part on receiving the quantity of write commands and updating the mapping.

11. The non-transitory computer-readable medium of claim 7, wherein the memory management operation comprises a power operation, a cache synchronization operation, a data relocation operation, or any combination thereof.

12. A method performed by a memory system, comprising:
determining a configuration for performance of a memory management operation for the memory system;
receiving, before performing the memory management operation, a quantity of write commands;
determining whether the quantity of write commands comprise non-consecutive logical block addresses of the memory system;
delaying the configured performance of the memory management operation for a duration after receiving the quantity of write commands in response to the quantity of write commands satisfying a quantity threshold, a size of data associated with each write command satisfying a data size threshold, and determining that the write commands comprise the non-consecutive logical block addresses, wherein the duration is based at least in part on the quantity of write commands;
performing, during the duration, one or more write operations in accordance with at least one write command of the quantity of write commands;
performing the memory management operation after performing the one or more write operations and delaying the configured performance of the memory management operation for the duration; and
updating a mapping between logical block addresses and physical addresses of the memory system based at least in part on performing the memory management operation.

13. The method of claim 12, further comprising:
determining whether a second quantity of write commands stored in a buffer before being performed satisfies a buffer threshold, wherein delaying the configured performance of the memory management operation for the duration is based at least in part on determining whether the second quantity of write commands satisfies the buffer threshold.

14. The method of claim 12, further comprising:
receiving a second quantity of commands comprising unmap commands, copy commands, or both, wherein delaying the configured performance of the memory management operation for the duration is based at least in part on receiving the second quantity of commands.

15. A memory system, comprising:
one or more memory devices; and
processing circuitry coupled with the one or more memory devices and configured to cause the memory system to:
  determine a configuration for performance of a memory management operation;
  receive, before performing the memory management operation, a sequence of commands to access logical block addresses of the one or more memory devices;
  determine whether the sequence of commands comprise non-consecutive logical block addresses of the one or more memory devices;
  delay the configured performance of the memory management operation for a duration after receiving the sequence of commands in response to a quantity of the sequence of commands satisfying a threshold, a size of data associated with each command of the sequence of commands satisfying a data size threshold, and determining that the sequence of commands comprise the non-consecutive logical block addresses, wherein the duration is based at least in part on a relationship between the logical block addresses of the sequence of commands;
  perform, during the duration, one or more access operations in accordance with at least one command of the sequence of commands;
  perform the memory management operation after performing the one or more access operations and delaying the configured performance of the memory management operation for the duration; and
  update a mapping between the logical block addresses and physical addresses of the one or more memory devices based at least in part on performing the memory management operation.

16. The memory system of claim 15, wherein the processing circuitry is further configured to cause the memory system to:
  update a cache at the one or more memory devices based at least in part on updating the mapping.

17. The memory system of claim 15, wherein the processing circuitry is further configured to cause the memory system to:
  determining whether a quantity of commands stored in a buffer before being performed satisfies a buffer threshold, wherein delaying the configured performance of the memory management operation for the duration is based at least in part on determining whether the quantity of commands satisfies the buffer threshold.

18. The memory system of claim 15, wherein the relationship between the logical block addresses of the sequence of commands comprises a consecutive relationship or a non-consecutive relationship.

19. The memory system of claim 15, wherein the sequence of commands comprise one or more write commands, one or more read commands, one or more modify commands, one or more unmap commands, one or more copy commands, or any combination thereof.

20. The memory system of claim 15, wherein the memory management operation comprises a power operation, a cache synchronization operation, a data relocation operation, or any combination thereof.

* * * * *